United States Patent
Kolacny

(10) Patent No.: US 6,261,051 B1
(45) Date of Patent: Jul. 17, 2001

(54) FAN DUCT COMBINATION UNIT

(76) Inventor: Gordon A. Kolacny, 513 W. 29th St., Loveland, CO (US) 80538

( * ) Notice: Subject to any disclaimer, the term of this patent is extended or adjusted under 35 U.S.C. 154(b) by 0 days.

(21) Appl. No.: 09/145,458

(22) Filed: Sep. 2, 1998

(51) Int. Cl.[7] ............................. F01D 1/00; F04D 23/00
(52) U.S. Cl. ..................... 415/53.3; 415/53.1; 415/224
(58) Field of Search ............................ 415/53.1, 53.2, 415/53.3, 203, 224; 416/178, 187

(56) References Cited

U.S. PATENT DOCUMENTS

| | | | |
|---|---|---|---|
| 507,445 | * 10/1893 | Mortier | 415/53 |
| 1,548,341 | * 8/1925 | Banki | 415/53.3 |
| 1,838,169 | * 12/1931 | Anderson | 415/53.1 |
| 1,920,952 | * 8/1933 | Anderson | 415/151 X |
| 2,324,011 | * 7/1943 | Miller | 416/185 |
| 2,914,243 | * 11/1959 | Eck | 415/53.2 |
| 2,942,773 | * 6/1960 | Eck | 415/53.2 |
| 3,033,441 | * 5/1962 | Coester | 415/53.1 |
| 3,116,011 | * 12/1963 | Laing | 415/53.3 |
| 3,161,348 | * 12/1964 | Laing | 415/53.1 |
| 3,165,258 | * 1/1965 | Wentling et al. | 415/178 |
| 3,288,355 | * 11/1966 | Laing | 415/53.3 |
| 3,295,750 | * 1/1967 | Laing | 415/53.1 |
| 3,325,089 | * 6/1967 | Vogler | 415/53.3 |
| 3,481,530 | * 12/1969 | Korovkin | 415/53.2 |
| 3,536,416 | * 10/1970 | Glucksman | 416/178 |
| 3,816,023 | * 6/1974 | Shaver | 416/178 |
| 3,833,006 | * 9/1974 | Temple | 415/148 X |
| 4,165,950 | * 8/1979 | Masai et al. | 416/178 |
| 4,579,506 | * 4/1986 | Ossberger et al. | 415/54 |
| 4,705,453 | * 11/1987 | Hopfensperger | 415/119 |
| 4,836,743 | * 6/1989 | Gue ou et al. | 415/53.1 |
| 5,449,271 | * 9/1995 | Bushnell et al. | 415/53.2 X |

* cited by examiner

Primary Examiner—John E. Ryznic
(74) Attorney, Agent, or Firm—Joseph C. Herring

(57) ABSTRACT

A modified cross flow fan 10, intake duct 25 and exhaust duct 26 combination has the intake duct 25 spanning 160°–180° of the anterior circumference of the fan 10. The location of the upper surface 27 adjacent fan 10 is determined by a substantially increasing power requirement and a substantial diminishing of exhaust gas outputs. The upper surface 26 near the fan 10 preferably has a curvature similar to the curvature of blades 12. The lowermost location of the lower surface 28 of the intake duct 25 is at the point of an increase in the relative vacuum of the external intake gas pressure.

The fan 10 has blades 12 creating an internal working space ratio of at least about 5:1. Blade 12 count will vary with intended usage and size, e.g., from 16–60 or more. Blades 12 are preferably angled at 50°–60° from the radius line of the fan 10 and have an inner surface curvature of 60°–80°.

The exhaust duct 26 spans 100°–120° of the fan's circumference at the lower rear of fan 10. The upper surface 29 of exhaust duct 26 adjacent fan 10 is positioned at a point just below a substantial drop in exhaust gas velocity and the lower surface 31 curves under fan 10 to a point where the exhaust gas flow through the fan's blades approaches linearity with surface 31 and there is minimal blowback.

12 Claims, 6 Drawing Sheets

FAN DUCT COMBINATION UNIT

BACKGROUND OF THE INVENTION

The literature is replete with designs relative to cross flow and tangential fans. Pertinent references are:

U.S. Pat. No. 1,548,341 to Elemer Banki teaches a water turbine with backward facing blades and a flap to control flow.

U.S. Pat. No. 1,838,169 and U.S. Pat. No. 1,823,579 to E. L. Anderson teach a heating and ventilation unit where the blower is offset within the duct.

U.S. Pat. No. 1,920,952 to E. L. Anderson teaches a line-flow fan in which there is a guide from the duct wall which is directed to a point of neutral pressure on the periphery of the fan.

U.S. Pat. No. 2,658,700 to A. R. Howell teaches a turbo compressor with multiple concentric sets of blades for use in aircraft.

U.S. Pat. No. 3,082,976 to Peter Dornier teaches a combination aerodynamic and ground effect flight craft including a fan for taking air from above the \wings and ejecting it below the wings.

U.S. Pat. No. 2,914,243 and RE 25,365 to Bruno Eck teach the use of a fan which is neither radial or axial flow but which utilizes guide vanes within the fan to reduce fan noise output.

U.S. Pat. No. 3,161,348 to Nikalous Laing teaches a cross flow fan where the air flow is across the center and complex ducting is used to control the air flow.

U.S. Pat. No. 3,460,647 to Nikalous Laing teaches a hovercraft in the form of an automobile. Cross flow, i.e., tangential blowers positioned on each side of the automobile provide the desired lift.

U.S. Pat. No. 3,481,530 to A. G. Korovkin teaches a diametral fan duct work with internal vanes to control air flow.

From the plethora of references available, it is obvious that blade, fan, and duct design selections vary with the design objectives. Thus, the references relate to many subjects, e.g., reducing exhaust noise, shifting exhaust noise to a desired frequency band and reducing the energy required to drive the fan.

Basically, it appears that there is data available relative to designing combinations of fans and ducting for items ranging from cooling microelectronic devices and air conditioners to powering hovercraft and aircraft. As a result, the teachings of some references are appropriate for their designated purposes while the same teachings will be of little relevance for other purposes.

The tangential fan/duct combination of this invention provides a high volume/high velocity exhaust gas which is substantially proportional to the much lower fan rpm, i.e., at ratios of exhaust gas velocity to blade tip speed of 2.5:1. Its uses range from tennis and baseball pitching machines to craft, which can combine hover and aerodynamic flight operations. This capability, for example, enables the pilot of the craft to follow the procedures utilized with aerodynamic flight aircraft while flying, i.e., for aerodynamic flight take off, the engine operation is at maximum power (rpm) while landing at reduced power (rpm).

SUMMARY OF THE INVENTION

The modified cross flow fan/duct combination has an intake duct, which spans 160°–180° of the circumference and anterior face of the fan. Speaking in terms of FIG. 9, the upper surface of the intake duct is curved downwardly to the point of closest approach to the fan, (point A) at a location just anterior to the position where there is a substantial drop in power demand at a given rpm combined with at substantial increase in exhaust gas velocity. The point of closest approach to contact with the fan of the lower surface of the intake duct (point B) is located just anterior to the place at which there is a substantial increase in the substantially uniform relatively lower velocity external to the 40-blade fan because of backflow from within the fan.

The exhaust duct width spans 100°–120° of the fan circumference at the rear, lower section of the fan. The lower point of closest approach by the bottom of the exhaust duct to the fan is at a point where the exhaust gas flow through the impeller blade and into the exhaust duct (point C) is substantially linear with little or no backflow into the intake duct, i.e., at point B. Point C and point D can be the same. The point of closest approach of the upper surface of the exhaust duct is located at a point just below that point on the fan (point D) where there is a substantial reduction in exhaust gas velocity.

A 9" fan is used as a basis for describing the invention and the Figures and will have 40–45 curved blades which are on the order of one inch wide. The blades are angled so that their inner ends are farther apart than their outer ends and are preferably positioned 8° apart to 10° apart around the circumference of the fan. The impeller blades are separated by about 8° apart with 45 blades, 9° apart with 40 blades, 10° apart with 36 blades, etc. The positional angle of the blade will vary from 29° to 34° and preferably 30° to 32° from the vertical (See FIG. 4). This fan/duct combination can be scaled upwards and downwards with minor changes and with the addition of impeller blades to maintain a predetermined distance between such blades in larger fans. Modifications in the upper intake duct surface are made to increase fan efficiency as intake gas pressures increases above atmospheric pressure.

DETAILED DESCRIPTION OF THE FIGURES

The numbers identifying elements of the invention remain the same from figure to figure where practical.

Figure 1:
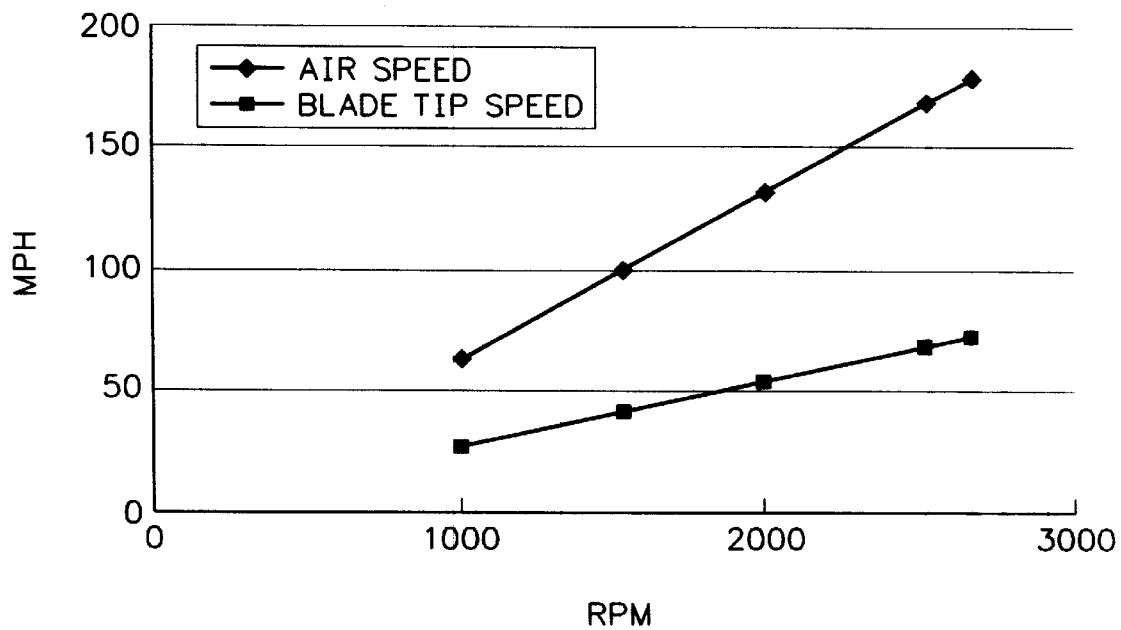
FIGS. 1 and 2 are graphs of a fan's exhaust velocity, blade tip speed and air volume plotted against fan revolutions per minute.
Figure 2:
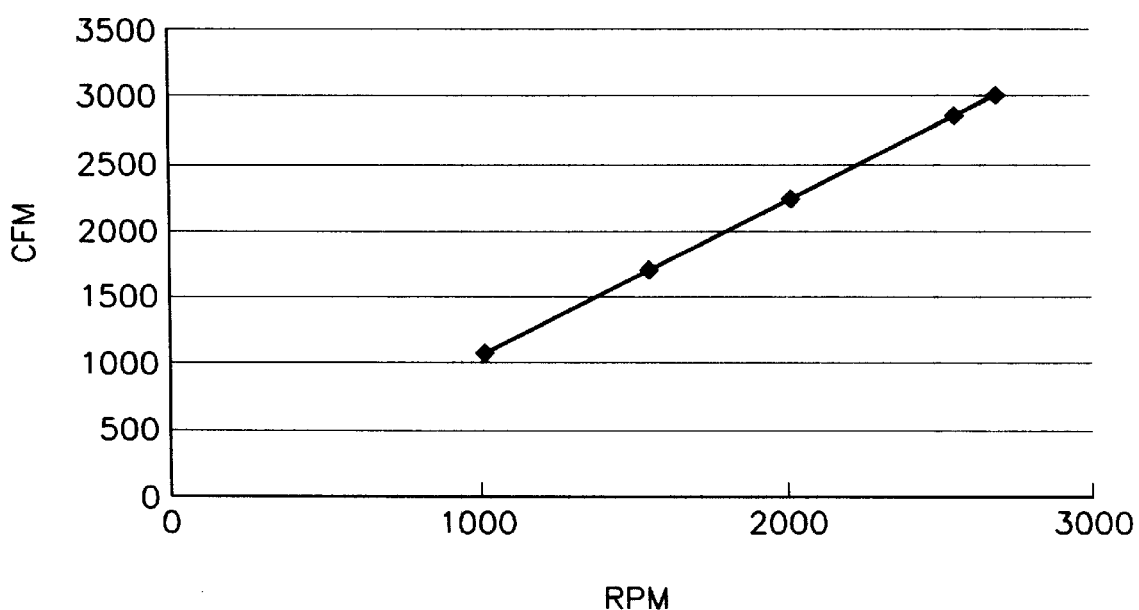

FIGS. 1 and 2 are graphs of air speed, blade tip speed and volume plotted against the rotation per minute using Air Movement Control Association Standards. The data show a definite linearity of results, which enhance the usability of the fan/duct combination for hovercraft and aerodynamic flight operations.

Figure 3:
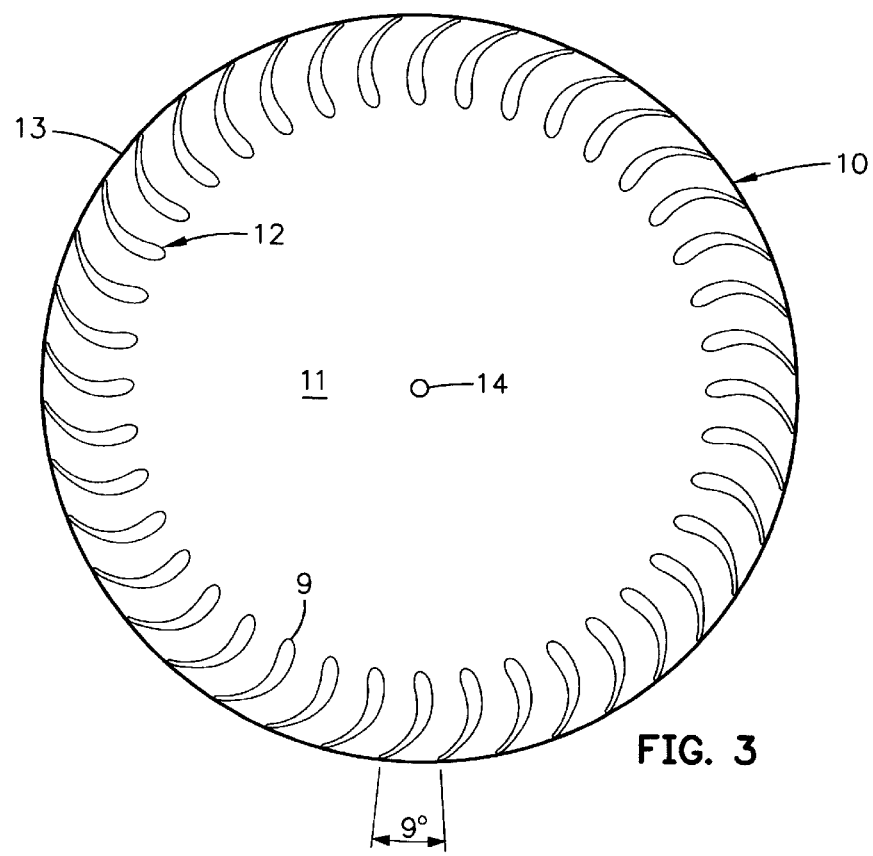
FIG. 3 is a section view of a fan showing a preferred blade separation.

FIG. 3 depicts a section of a fan 10 having end disks 11 and forty blades 12 positioned at the edge 13 of disks 11 with a centered axle 14. The blades 12 are positioned 9° apart measured from the outside curve of one blade to the inside tip surface 9 of the next blade.

Figure 4:
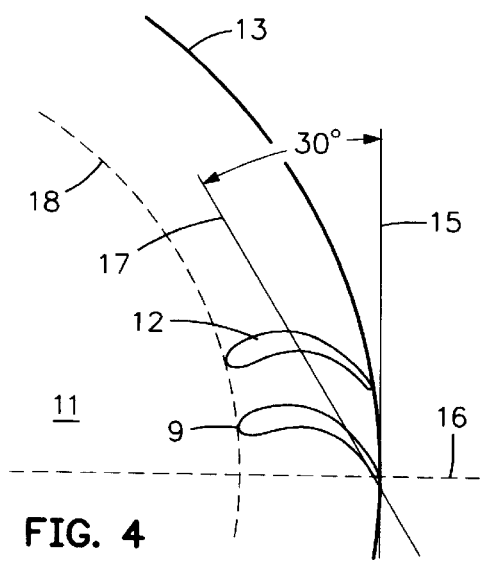
FIG. 4 depicts a preferred angle of attachment of an impeller blade to an end disk.

The two impeller blades of FIG. 4 are shown in a preferred position on the edge 13 of an end disk 11. The positioning of each blade 12 can be established by first forming right angled vertical line 15 and extended disk 12 equator line 16, then placing the disk edge 13 on vertical line 15 and the outer tip of each blade 12 at the intersection of the right angle lines 15 and 16, as shown. The outer lower surface of blade 12 adjacent to the tip is then placed along the 30° line 17 so as to have the inner tip of blade 12 touch circle 18—the point of contact of the inner tips of all blades 12.

Figure 5:
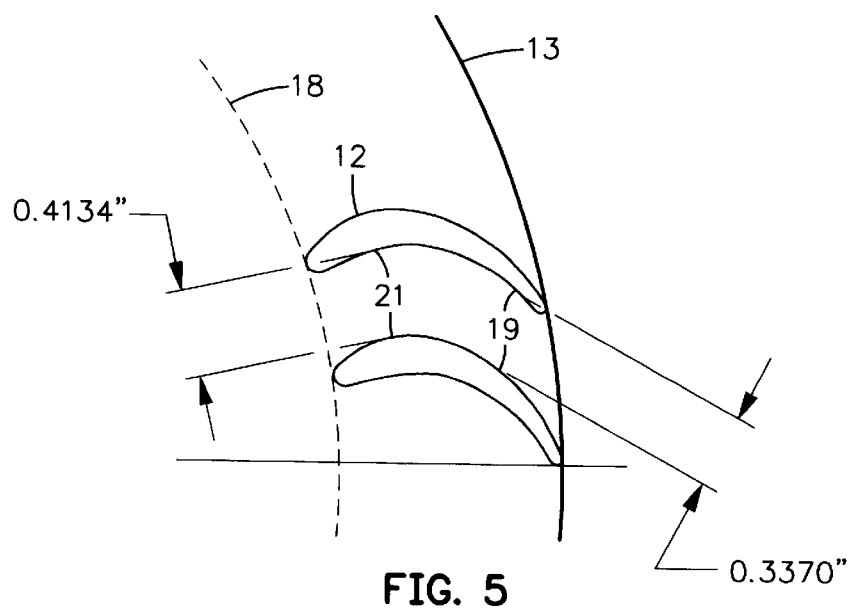
FIG. 5 provides the distance measurements between impeller blades of a preferred shape which have been enlarged for purposes of the Figure.

FIG. 5 shows the distances, in inches, of two blades 12 between disk edge 13 and circle 18. Once the initial blade 12 angle is established by the approach of FIG. 5, additional blades 12 can be added by positioning them at the shown measured distances 18 and 21.

Figure 6:
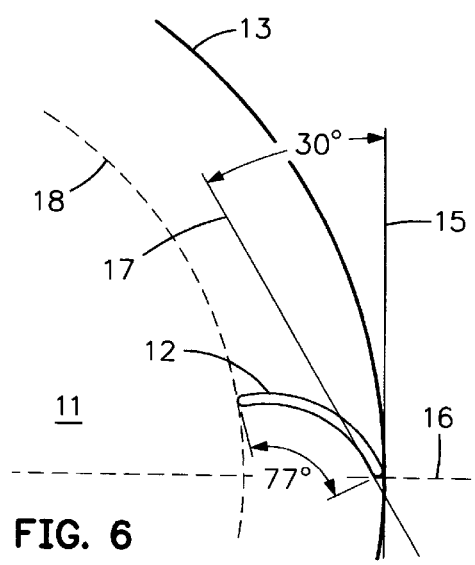
FIG. 6 depicts the curvature angles of an impeller blade of uniform thickness.

FIG. 6 shows the radial curvature of a preferred blade 12 with substantially parallel sides except that the ends are tapered. The blade 12 is positioned between edge 13 and circle 18. Again, the outer tip of the blade 12 is inserted at the intersection of lines 15 and 16. The 30° line 22 is aligned with the lower surface of the outer end of blade 12. The blade 12 has a 77° arc as shown.

Figure 7:
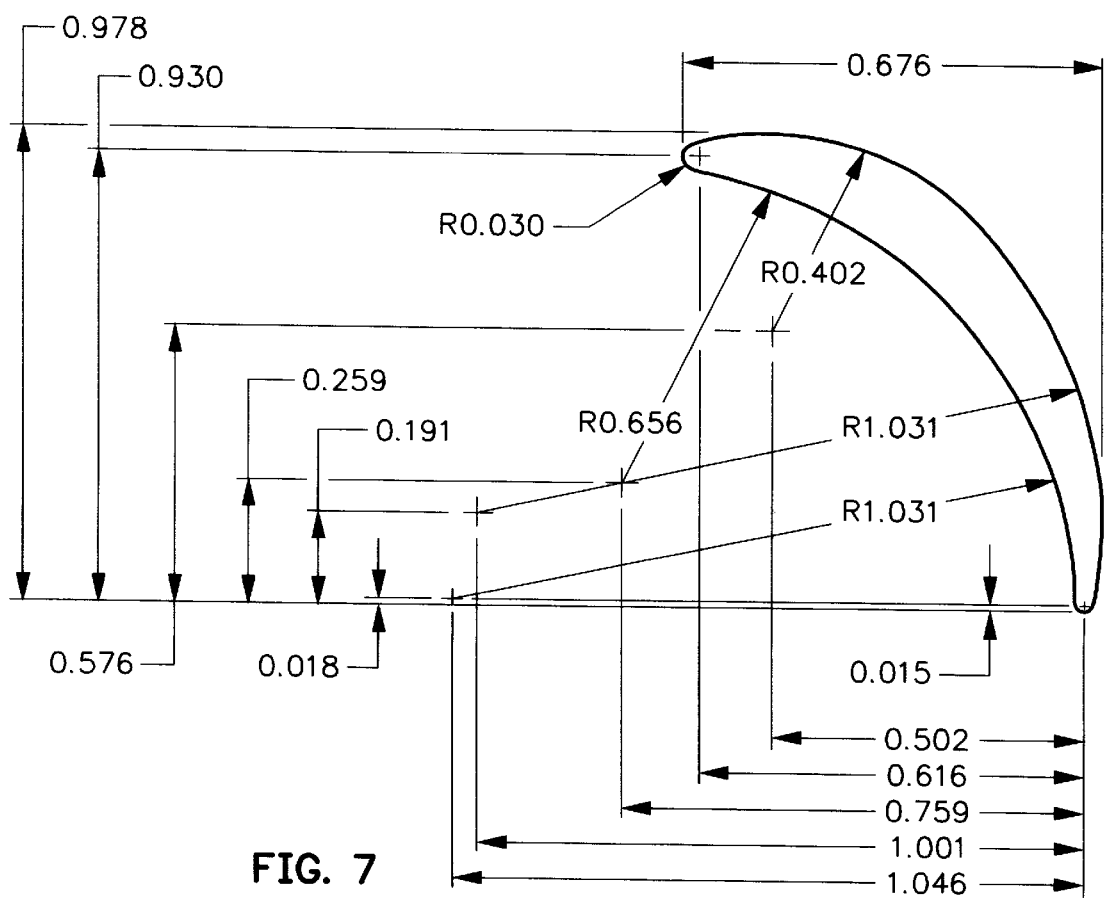
FIG. 7 depicts a preferred aerodynamic blade configuration with measurements stating its configuration.
Figure 8:
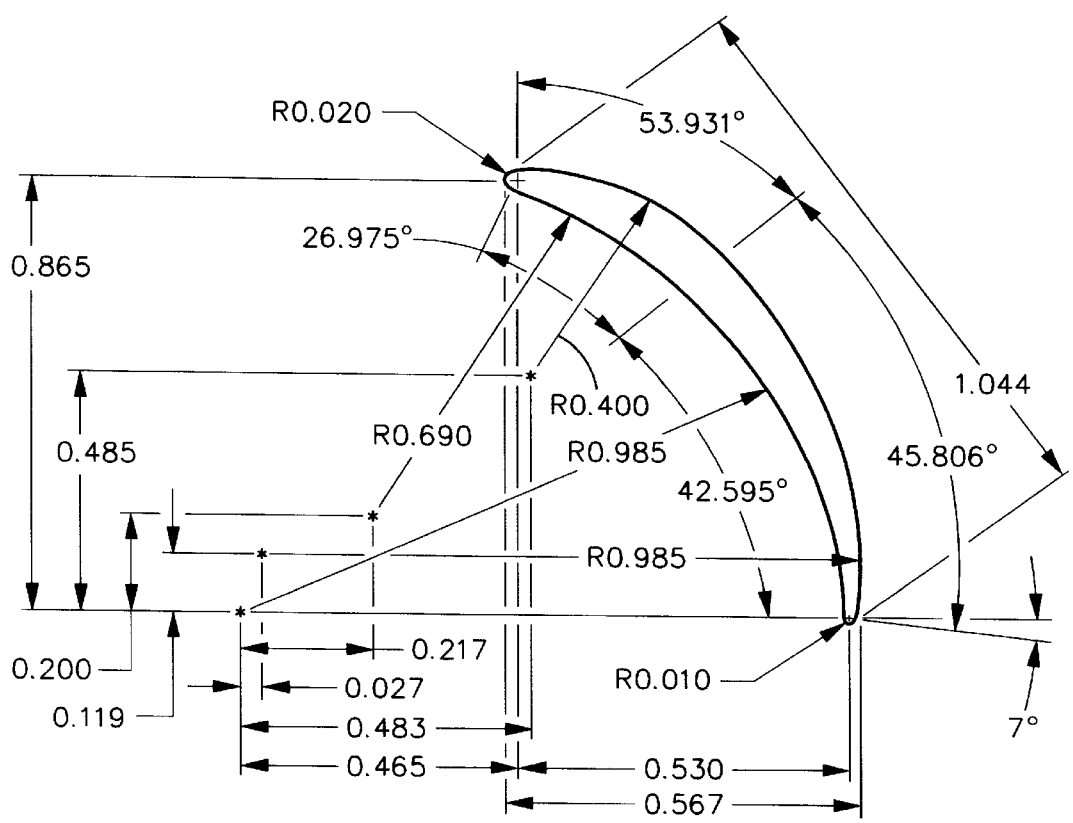
FIG. 8 depicts another preferred aerodynamic blade and measurements stating its configuration.

FIGS. 7 and 8 describe two preferred blade 12 configurations in terms of the measurements of standard shop drawings.

Figure 9:
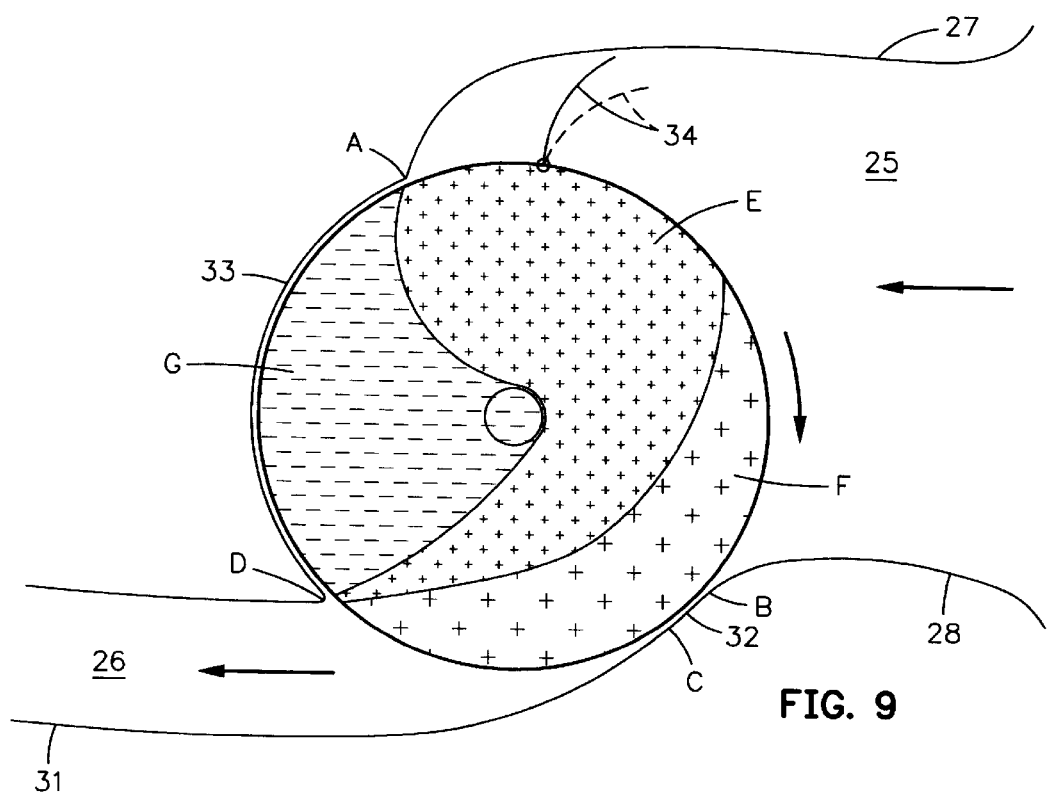
FIGS. 9 and 10 are sectional views of fan/duct configurations, pressure zones and streamlining mechanisms for ram air intake.

FIG. 9 schematically depicts a preferred fan 10, intake duct 25 and exhaust duct 26 configuration. Intake duct 25 has an upper surface 27 and a lower surface 28. The curvature of upper surface 27 as it approaches point A forces a substantial portion of the intake gas into the spinning blades 12 in a substantially linear fashion creating a medium pressure zone E. The additional gas input through the lower anterior blades augment the air pressure forming a higher pressure zone F. A lower pressure zone G exists in the area to the rear of zone G which is easily located by movement of Point A downward and/or point D upward. The schematically drawn zones are shown as they are thought to exist in non-ram air operations.

The point C position and the curvature of the lower surface 31 of exhaust duct 26 combine to reduce turbulence while achieving maximum exhaust velocities. This velocity remains substantially constant across the rear of fan 10 to point D. Edge effects reduce the velocity somewhat near the sides of the duct.

The effects of increasing intake air pressure require adjustment of the position of point A toward the right as shown. In FIG. 9, this effect is accomplished by placing a pivoting vane 34 into the air stream as shown. As the air pressure of the intake gas increases, e.g., as in increasing speeds while in aerodynamic flight, the vane 34 is rotated upward from its static position as shown by the dashed lines.

Figure 10:
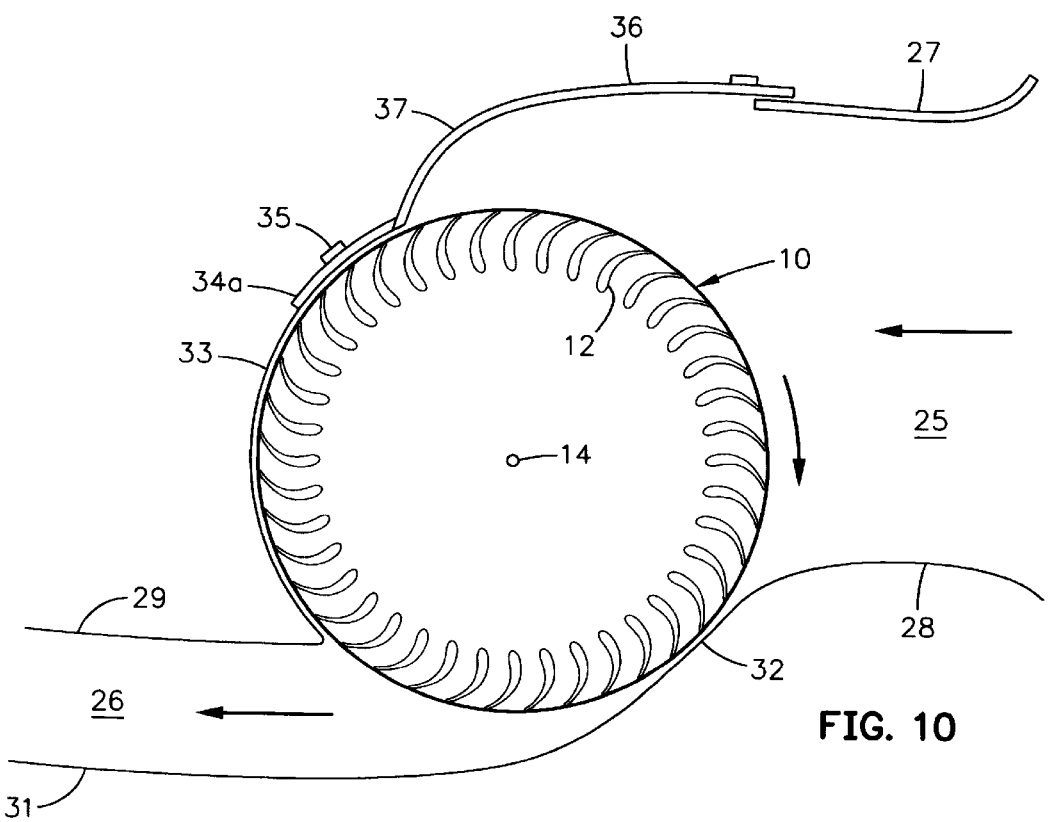

FIG. 10 is a section depicting the preferred fan/intake duct/exhaust duct configuration. The intake duct includes a more complex mechanism for increasing the fan/intake duct efficiency. In this model, the upper surface 27 of the intake duct 25 has been shortened. An insert 37 with a hinged and attached follower is moved forward over housing 33 by actuator arms 35 and 36 over the top surface 27 of the intake duct 16 as ram pressure increases. The actuator arms 35 and 36 maintain the insert 37 and follower 34a in close contact with the upper surface 27 of duct 25 and housing 33 and can modify both the curvature and position of the hinged insert 37.

Figure 11:
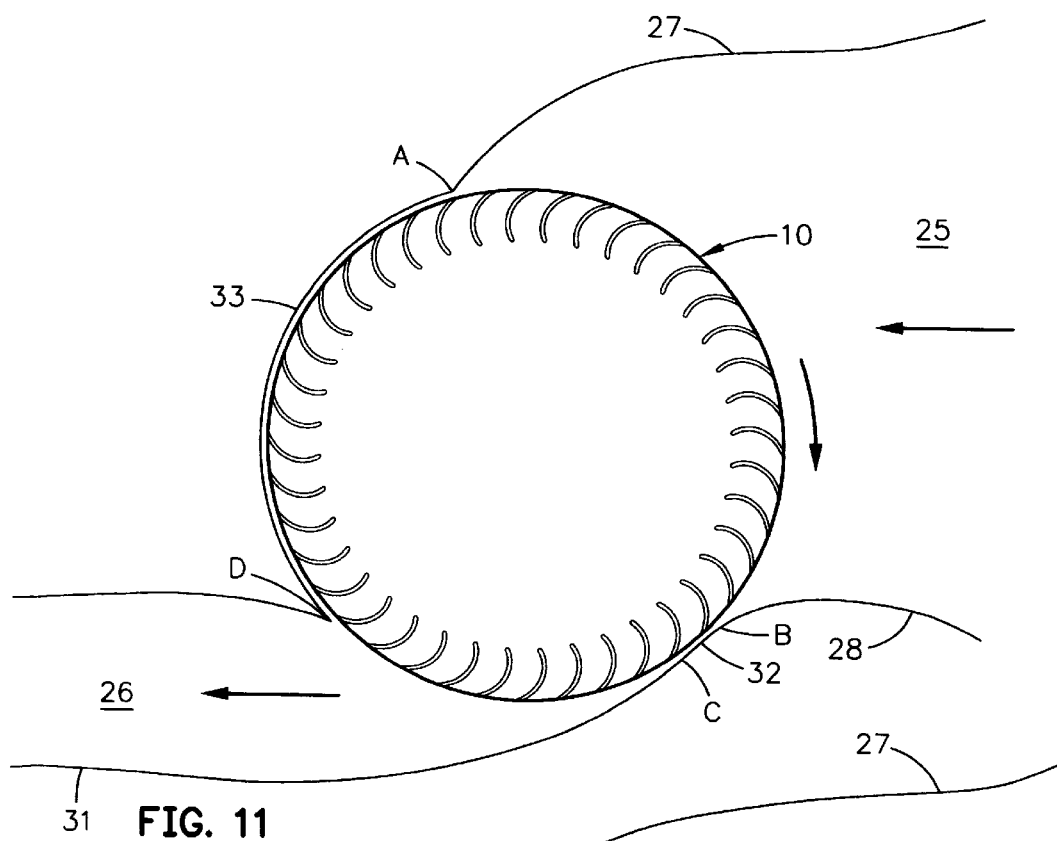
FIG. 11 depicts a fan/duct configuration which evolves as the blade attachment angle is increased toward 40° from 30°.

FIG. 11 depicts an intake and exhaust duct configuration where the blade attachment angle is increased from optimal to 40°. The blade curvature will be reduced, Points A and D will slide forward slightly and Points B and C will remain in about the same position. The height of the intake duct 25 will increase and the slope of the intake duct top surface 27 will flatten somewhat to maintain a substantially linear relationship with the changing blade curvature. The upper surface 31 of the exhaust duct also changes to maintain a more linear relationship with the reduced curvature blades and to enhanced laminar flow as the exhaust gas moves into the exhaust duct 26. As the fan/intake duct/exhaust configuration changes from a preferred blade angle (33°) of FIG. 9 toward the configuration of FIG. 11, the relationship between the exhaust gas velocity and the fan blade tip speed drops and the fan rpm must be increased to obtain a given exhaust gas velocity.

Figure 12:
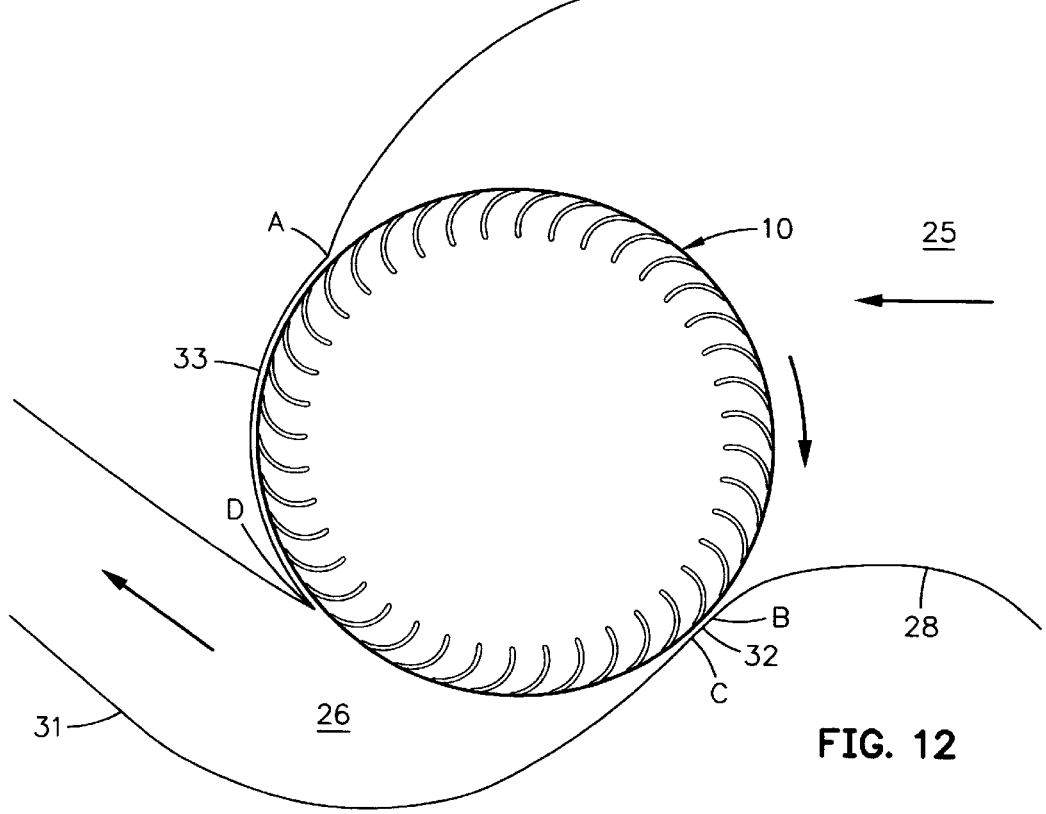
FIG. 12 depicts a fan/duct configuration which evolves as the blade attachment angle is decreased toward 20° from 30°.

The configuration of FIG. 12 is optimal when the blade attachment angle is reduced from 30° to 20°. As the blade attachment angle decreases, the blade curvature is increased. Point A is moved to the rear and the upper surface of the intake duct 25 flattened to maintain the linear relationship between the blade curvature and the upper duct surface 27. Points B, C and D are moved forward while Point D remains substantially fixed.

The bottom surface 31 of the exhaust duct 26 curves downward, then upward, to increase linearity between the fan blades and the exhaust duct and to provide as much laminar flow as is practical. The exhaust duct 26 is angled upward to preserve maximum laminar flow.

When the blade angle is reduced, the overall efficiency drops appreciably.

GENERAL DESCRIPTION OF THE INVENTION

The modified tangential fans have two end disks and other internal disks as are required to reduce torsional distortion and blade vibration to within acceptable limits. The fans, depending on their intended usage, can be made of plastic(s) and/or cold rolled steel (baseball throwing machines) to highly stable metal alloys with, where necessary, anti-wear coatings, e.g., tungsten carbide or tungsten nitride. For most purposes, fans can be constructed of steel or aluminum alloys.

The width of the fan will vary from a few inches to the width of automotive and aircraft fan intakes. The number of blades utilized will depend, in part, on the intended use of the unit, i.e., 16 to 60 or more blades are added as the design is scaled up from that of a racquetball thrower to an aircraft. The number of blades will increase somewhat as the configuration changes from that of the most preferred shape (FIG. 7) to a similarly curved thin blade with flat sides, e.g., from a preferred 40 blades upward to 45 blades, at which point exhaust pulsation generally ceases. The blades should be positioned 6° to 10° apart and preferably about 8° to 10° apart The inner surface of the blades should have a curvature of 65°–80° and preferably from about 70° to about 75°. The diameter of the fan relative to the width of the blades preferably creates an internal working space ratio of at least about 4.8:1 and preferably 5:1.

Optimally, the exhaust duct configuration has the configuration of FIGS. 9 and 10. The exhaust duct configuration can, however, vary outwardly from the general shape of an inverted truncated pyramid, where the unit is used as a siren, to a more rectangular shape. However, the general configuration of the Figures is preferred as it provides a more laminar exhaust flow.

The intake gas flow can be improved in situations where there is an increased intake gas pressure by modifying position of point A, for example, as accomplished in FIG. 10, utilizing a rotatable vane to control intake gas flow by altering the curvature and the position of the upper surface of the duct.

Now having described my invention, what I claim is:

1. In a cross flow type fan/duct combination for moving gases, the improvement comprising:

an intake duct spanning 160°–180° of the anterior face of the fan;

the upper surface of which curves downwardly to the point of closest approach to the fan at substantially the same curvature as the curvature of the impeller blades just anterior to a point where there is a substantial drop in power requirement at a given rpm combined with a substantial increase in gas velocity;

the lower surface of the intake duct's closest approach to contact with the fan is located just anterior to the place where there is an increase in the substantially uniform air velocity external to the fan because of back flow from the fan/duct interface;

an exhaust duct which spans 100°–120° of the fan circumference at the lower rear of the fan where the lower surface of the exhaust duct is located at the point of closest approach of the rear exhaust duct to the fan and where the exhaust gas flow becomes substantially linear with little or no back flow into the intake duct; and the upper surface is located at the point of closest approach of the upper surface of the exhaust duct to the fan is just above the point where there is a substantial reduction in exhaust gas velocity; and a fan having essentially no internal vortex reducing mechanism and end disks with forward facing blades having an inner surface curvature of about 65° to about 80° and the inner surface of the outer ends of the blades is angled at about 30° to 34° from the vertical.

2. In a cross flow type fan for moving gases having an exhaust volume output to fan rpm relationship which is substantially linear over the fan operating range and exhaust duct combination having a fan with a plurality of end disks, the improvement comprising:

an intake duct having an upper surface which curves downwardly toward the fan at substantially the same curvature as the curvature of the impeller blades at the point of closest approach to a location proximate to the upper surface of the fan just anterior to the point that there is substantially increasing power requirement combined with a substantial reduction in exhaust gas velocity and a lower surface that is positioned proximate to the fan at the point of an increase in the intake gas pressure external to the fan, an exhaust duct offset from the intake duct having an upper surface location adjacent to and below the point of a substantial drop in exhaust gas velocity and a lower surface location where the lower surface curves under and remains substantially separated from the fan to a point where the exhaust gas flow through the fan's blades approaches linearity with the curvature of the lower surface of the duct adjacent to the fan and a cross flow type fan having no internal vortex reducing mechanism and forward facing blades having an inner surface curvature of about 65° to about 80° and the inner surface of the outer ends of the blades is angled at about 30° to 34° from the vertical.

3. In a cross flow type fan for moving gases having an exhaust gas speed to blade tip speed relationship which is substantially linear, an intake duct and exhaust duct combination having a fan with a plurality of end disks and a greater plurality of impeller blades comprising:

an intake duct having an upper surface which curves downwardly toward the fan at substantially the same curvature as the curvature of the impeller blades to a location proximate to the upper surface of the fan just lower than the point that there is an increasing power requirement combined with a substantial reduction in exhaust gas velocity and a lower surface that is positioned proximate to the fan substantially at the point of an increase in the intake gas pressure external to the fan, an exhaust duct offset from the intake duct having an upper surface location adjacent and below the point of a substantial drop in exhaust gas velocity and a lower surface location at the point where the lower surface curves under the fan to a point where the exhaust gas flow through the fan's blades approaches substantial linearity with the curvature of the lower surface of the duct adjacent to the fan and a cross flow type fan having no internal vortex reducing mechanism, forward facing blades with an inner surface curvature of about 65° to about 80° and the inner surface of the outer ends of the blades is angled at about 30° to 34° from the vertical.

4. The cross flow fan of claims 1, 2 or 3 wherein the fan includes upwards of about 16 blades.

5. The cross flow fan of claims 1, 2 or 3 wherein the inner surface of the outer ends of the blades are angled at from about 30° to about 34° from the vertical.

6. The cross flow fan of claims 1, 2 or 3 wherein the blades are angled at from about 30° to about 32° from the vertical.

7. The cross flow fan of claims 1, 2 or 3 wherein the blades are positioned from about 6° to about 10° apart in fans with blades of a curvature of 75° to about 80° and an entry angle of about 30° to 34°.

8. The cross flow fan of claims 1, 2 or 3 wherein the blades are positioned from about 8° to about 10° apart in fans with blades of a curvature of 76° to about 78° and an entry angle of about 30° to 34°.

9. The cross flow fan of claims 1, 2 or 3 wherein the inner ends of the blades are positioned farther apart than the outer ends of the blades.

10. The cross flow fan of claims 1, 2 or 3 wherein the upper surface of the intake duct proximate to its closest approach to the fan includes a mechanism that can be moved toward the direction of the intake gas stream.

11. The cross flow fan of claims 1, 2 or 3 wherein the upper surface of the intake duct proximate to its closest approach to the fan includes a mechanism that can be moved toward the direction of the intake gas stream and wherein the mechanism has a configuration, the shape of which can be controlled to correspond to changes in intake gas pressures above atmospheric pressure.

12. The cross flow fan of claims 1, 2 or 3 further including a vane mechanism that can be rotated from a position proximate to the fan surface to a position proximate to the upper surface of the intake duct to compensate for changes in intake gas pressures above atmospheric gas pressure and is positioned proximate to the fan below the upper surface of the intake duct.

* * * * *